United States Patent
Iwamura et al.

(10) Patent No.: US 7,100,070 B2
(45) Date of Patent: Aug. 29, 2006

(54) COMPUTER SYSTEM CAPABLE OF FAST FAILOVER UPON FAILURE

(75) Inventors: Takashige Iwamura, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 117 days.

(21) Appl. No.: 10/850,251

(22) Filed: May 21, 2004

(65) Prior Publication Data
US 2005/0198327 A1  Sep. 8, 2005

(30) Foreign Application Priority Data
Mar. 2, 2004  (JP) .............................. 2004-057306

(51) Int. Cl.
*G06F 11/00* (2006.01)
(52) U.S. Cl. ........................................................ 714/4
(58) Field of Classification Search ...................... 714/4
See application file for complete search history.

(56) References Cited

U.S. PATENT DOCUMENTS

| | | | |
|---|---|---|---|
| 6,006,331 A * | 12/1999 | Chu et al. ........................ | 726/5 |
| 6,606,643 B1 | 8/2003 | Emens et al. | |
| 6,874,106 B1 * | 3/2005 | Suzuyama et al. ............. | 714/57 |
| 2002/0010798 A1 * | 1/2002 | Ben-Shaul et al. ............. | 709/247 |
| 2002/0095489 A1 | 7/2002 | Yamagami | |
| 2003/0097454 A1 | 5/2003 | Yamakawa et al. | |
| 2003/0120680 A1 * | 6/2003 | Agrawal et al. ......... | 707/103 R |
| 2003/0126133 A1 | 7/2003 | Dattatri et al. | |
| 2004/0158766 A1 | 8/2004 | Liccione et al. | |
| 2004/0162901 A1 | 8/2004 | Mangipudi et al. | |

FOREIGN PATENT DOCUMENTS

JP  2002-312189  10/2002

OTHER PUBLICATIONS

R. J. Schemers "lbnamed: a load balancing name server in Perl", Proceedings of the Systems Administration Conference, Sep. 17, 1995, pp. 1-11.
A. Shaik et al, "On the effectiveness of DNS-based server selection", Proceedings IEEE Infocom 2001, The Conference on Computer Communications 20th Annual Joint Conference of the IEEE Computer and Communications Societies, vol. 1 of 3 Conf. 20, Apr. 22, 2001, pp. 1801-1810.
M. Poulson "Web Site Failover Scenario" Microsoft Corporation, Feb. 4, 2004, pp. 2.
Mockapetris, P., *"Request for Comments: 1034, Domain Names—Concepts and Facilities"*, http://www.letf.org/rfc/rfc1034.txt; Nov. 1987.pp. 1-49. [in English].

* cited by examiner

*Primary Examiner*—Bryce P. Bonzo
(74) *Attorney, Agent, or Firm*—Mattingly, Stanger, Malur & Brundidge, P.C.

(57) ABSTRACT

To provide a computer system capable of fast failover so that a service is stopped only for a brief period of time from a failure in a first site. The computer system includes a primary site for regular operation and a secondary site that operating when the primary site fails. A primary storage and a secondary storage have a synchronization unit to make contents stored in the primary storage and contents stored in the secondary storage identical to each other. A client has a cache for recording address information (e.g. DNS) that gives the client an access to the server from which the service is provided and information that defines a time to live of the address information. A first server has a primary request log processing unit, which instructs the client to shorten the recorded time to live of the address information when communication with the secondary site is detected to be impossible.

10 Claims, 10 Drawing Sheets

COMPUTER SYSTEM CAPABLE OF FAST FAILOVER UPON FAILURE

BACKGROUND OF THE INVENTION

The present invention relates to a computer system run on a primary site and a secondary site switching technique for when a failure takes place.

There are many systems running in an information-driven society that provide services via the Internet, for example, a ticket reservation system and a network banking system. Many of such systems has two sites (a primary site and a secondary site) and keeps the secondary site on hot standby, so that switching is made quickly to the secondary site in case the primary site suffers a failure making the failure to stop the system only for a brief period of time (see JP 2002-312189 A, for example).

The Internet has a DNS server for name resolution processing, which gives an IP address of a server accessed by a client. A cache of DNS information that gives the IP address is set on Internet, to thereby lighten the load of the DNS server and shorten the name resolution processing time (for example, see Request for Comments: 1034, "Domain Names—Concepts and Facilities", http://www.ietf.org/rfc/rfc1034.txt).

SUMMARY OF THE INVENTION

Upon occurrence of a failure as described above, the DNS information in the DNS server is updated to switch the site to be accessed from the primary site to the secondary site. However, depending on the time to live (TTL) of the DNS information cache set on the Internet, the updated DNS information may be overridden by the cached DNS information. The client accordingly accesses to the primary site and it takes time to redirect the client to the secondary site, thus prolonging the time period during which the service is stopped.

The present invention has been made in view of the above, and an object of the present invention is therefore to provide a computer system capable of fast failover so that a service is stopped only for a brief period of time from a failure in a first site.

According to the present invention, a primary storage and a secondary storage comprising a remote copy unit to make contents stored in the primary storage and contents stored in the secondary storage identical to each other, in which: a client has a cache for recording address information (e.g. DNS) that gives the client an access to the server from which the service is provided and information that defines a time to live of the address information; and the first server has a primary request log processing unit, which instructs the client to shorten the recorded time to live of the address information when communication with the secondary site is detected to be impossible.

According to the present invention, failover (switchover to a second site) can be completed at an increased speed.

DETAILED DESCRIPTION OF THE PREFERRED EMBODIMENT

An embodiment of the present invention will be described below with reference to the accompanying drawings.

Figure 1:
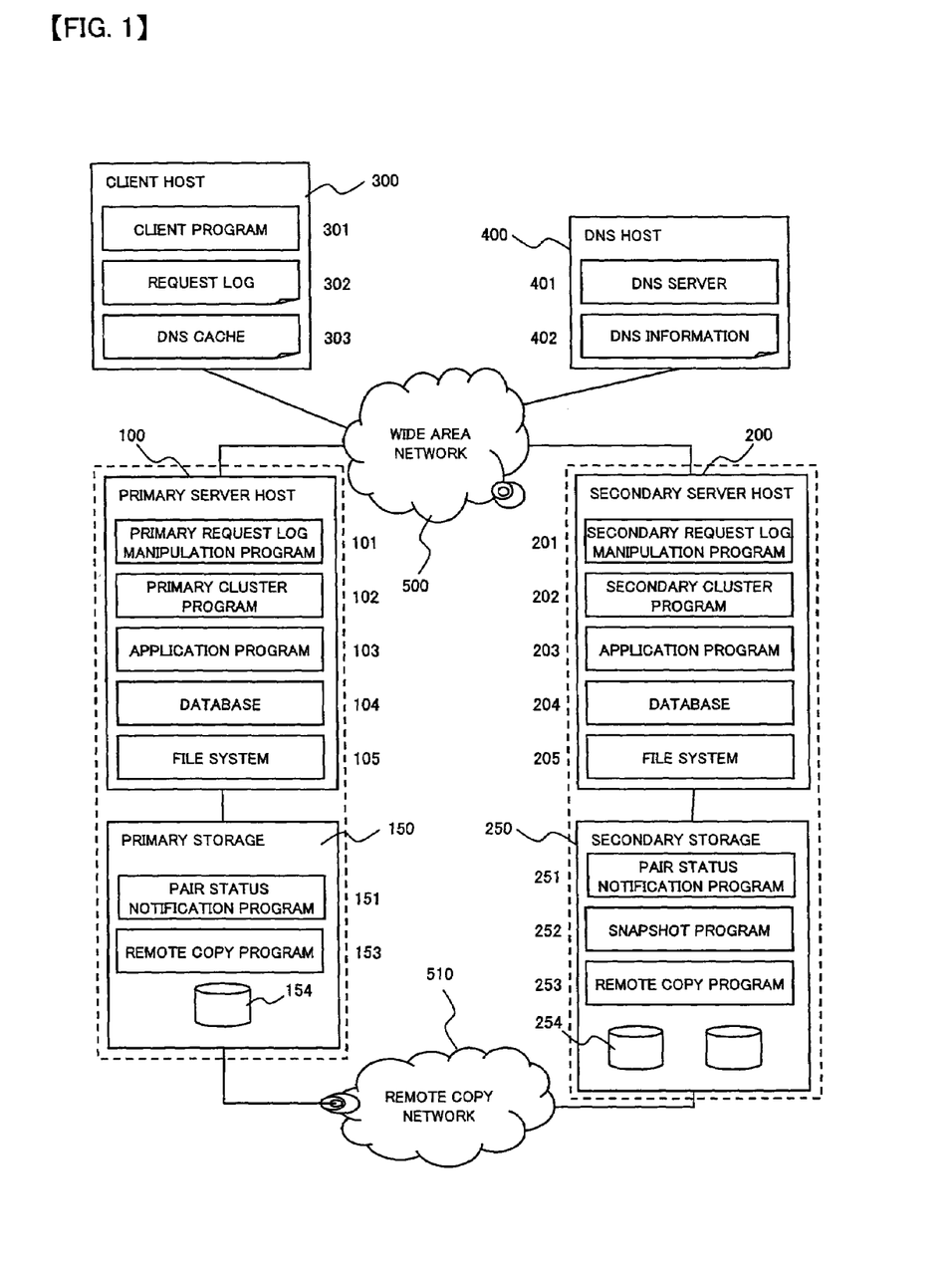
FIG. 1 is a block diagram showing the structure of a computer system according to an embodiment of the present invention.

FIG. 1 is a block diagram showing the structure of a computer system according to the embodiment of the present invention.

The computer system according to the present invention is composed of a primary server host 100, a primary storage 150 connected to the primary server host 100, a secondary server host 200, a secondary storage 250 connected to the secondary server host 200, a client host 300 which receives service provided from the primary server host 300, and a DNS host 400. The primary server host 100 and the primary storage 150 constitute a primary site for regular operation. The secondary server host 200 and the secondary storage 250 constitute a secondary site provided for operation when occurrence of a failure in the primary site.

The primary server host 100 is a computer device equipped with a CPU, a memory, a storage unit, and interfaces, and various programs are run on the host. Specifically, a primary request log processing program 101, a primary cluster program 102, and an application program 103 are run on the primary server host 100.

The primary request log processing program 101 instructs the client host 300 to execute processing regarding a request log upon detection of a failure suspension, which will be described later.

The primary cluster program 102 is notified of remote copy monitor results from a pair status monitor program 151 of the primary storage 150, and monitors the remote copy pair status. The primary cluster program 102 also monitors the operation of the secondary server host 200 using a failure monitoring method such as heart beat. Instead of the primary cluster program 102, other components of the primary server host 100 may monitor the secondary server host 200.

The application program 103 provides with a database or a web service for the client host 300, which is connected to the primary server host 100 through a wide area network 500.

A database system 104 and/or a file system 105 is also run on the primary server host 100 in order to enable the application program 103 to access to the primary storage 150.

The database system 104 changes an access from the application program (in particular, database application program) 103 into a block access or file I/O, and sends a data input/output request to the primary storage 150. The database system 104 enables the application program 103 to input and output data on a data-by-data basis stored in a database.

The file system 105 changes a file access from the application program 103 or from the database system 104 into a block access, and sends a data input/output request to the primary storage 150. The file system 105 enables the application program 103 to input and output data on a file-by-file basis.

The primary server host 100 has an interface to the wide area network 500 (e.g., NIC: Network Interface Card such as Ethernet Card) and an interface to the primary storage 150 (e.g., SCSI: Small Computer System Interface, FC: Fibre Channel, or the like).

The primary storage 150 is a storage unit having a control unit, physical disks, and an interface to store data provided to the primary server host 100.

The control unit has a CPU and a memory, and sends data to the primary server host 100 upon receiving a data input/output request from the primary server host 100. The control unit has a pair status notification program 151 and a remote copy program 153 running therein.

The pair status notification program 151 monitors the status of remote copying implemented by the remote copy program 153, and notifies the primary server host 100 of results of the monitoring (remote copy pair status). For instance, when remote copying fails from a failure in a line (remote copy network 510), the pair status notification program 151 notifies the primary cluster program 102 of the fact.

The remote copy program 153 operates in conjunction with a remote copy program 253 of the secondary storage 250 to perform remote copy processing in which data stored in the primary storage 150 is copied to the secondary storage 250. There are two types of remote copying: synchronous remote copying and asynchronous remote copying, each of which has strong and weak points.

Specifically, in synchronous remote copying, a storage responds to a write request from a server host after the transfer of data relating to the write request is completed. Accordingly, it is not often in synchronous remote copying to lose data from occurrence of a failure whereas the I/O performance between a server host and a storage is getting lower if there is a large distance between primary and secondary storages and a delay due to a network becomes longer.

In asynchronous remote copying, on the other hand, a response to a write request from a server host by a storage is not timed based on the transfer of data pertaining to the write request. Accordingly, in asynchronous remote copying, a response can be sent to a computing machine before data is remote-copied and therefore the response performance for responding to a computing machine is hardly degraded by a long distance between primary and secondary storages, whereas the possibility of losing data is higher than in synchronous remote copying. The present invention can employ either type.

A logical unit (LU) 154, which is a logical volume, is set in the physical disk. Plural physical disks constitute RAID (Redundant Array of Independent Disks) to give redundancy to data stored in the storage. This prevents the storage from losing stored data over a failure in some of the physical disks.

The primary storage 150 has an interface to the primary server host 100 (e.g., SCSI: Small Computer System Interface, FC: Fibre Channel, iSCSI: internet SCSI, or the like).

The secondary server host 200 is a computer device equipped with a CPU, a memory, a storage unit, and interfaces, and the same programs as the ones in the primary server host 100 are run on the secondary server host 200. In short, the secondary server host 200 is kept in a standby state in which the secondary server host 200 operates in the same manner as the primary server host 100 to keep the hosts in an identical state (hot standby state). Keeping the secondary server host 200 on hot standby facilitates failover to a backup system (the secondary server host 200 and the secondary storage 250 which constitute the secondary site) immediately after a failure takes place in a main system (the primary server host 100 and the primary storage 150 which constitute the primary site), and the reliability of the system is thus improved. Note that, in the present invention, the secondary server host 200 may be kept on cold standby instead of hot standby as long as the secondary site can take over the job from the primary site upon failure.

Specifically, a secondary request log processing program 201, a secondary cluster program 202, and an application program 203 are run on the secondary server host 200.

The secondary request log processing program 201 collects a request log for the client host 300 when the main system fails.

The secondary cluster program 202 prepares the secondary server host 200 to take over operation from the primary server host 100 upon detection of a failure suspension, which will be described later. The secondary cluster program 202 also monitors the operation of the primary server host 100 using a failure monitoring method such as heart beat. Instead of the secondary cluster program 202, other components of the secondary server host 200 may monitor the primary server host 100.

The application program 203 is identical with the application program running on the primary server host 100, and provides the client host 300 with a database service, a web service, and the like upon failover.

A database system 204 and a file system 205 are run on the secondary server host 200 similar to the primary server host 100.

The secondary server host 200 has an interface to the wide area network 500 (e.g., NIC: Network Interface Card such as Ethernet Card) and an interface to the secondary storage 250 (e.g., SCSI: Small Computer System Interface, FC: Fibre Channel, iSCSI: internet SCSI, or the like).

The secondary storage 250 is a storage unit having a control unit, physical disks, and an interface to store data provided to the secondary server host 200.

The control unit has a CPU and a memory, and sends data to the secondary server host 200 upon receiving a data input/output request from the secondary server host 200. The control unit also has a pair status notification program 251, a snapshot program 252 and the remote copy program 253 running therein.

The pair status notification program 251 monitors the status of remote copying implemented by the remote copy program 253, and notifies the primary server host 100 of results of the monitoring (remote copy pair status). For instance, when remote copying fails from a failure in the communication network (remote copy network 510), the pair status notification program 251 notifies the primary cluster program 102 of the fact.

The snapshot program 252 takes a snapshot of an operating volume of a logical unit 254. For that reason, the snapshot program 252 manages a differential volume for storing differential data necessary to maintain the snapshot. The snapshot program 252 enables the file system 205 (or the database system 204) to access a virtual volume that provides the snapshot of the operating volume upon request from the file system 205 (or the database system 204). Moreover, the snapshot program 252 copies data from a area of the operating volume to a area of the differential volume, when write request to the area of the operating volume is received after the snapshot being taken, thus maintaining the snapshot.

The remote copy program 253 cooperates with the remote copy program 153 of the primary storage 150 to perform data copy processing in which data stored in the primary storage 150 is copied to the secondary storage 250.

A logical unit (LU) 254, which is a logical volume, is set in the physical disk. Plural physical disks constitute RAID.

The secondary server host 250 has an interface to the secondary server host 200 (e.g., SCSI: Small Computer System Interface, FC: Fibre Channel, or the like).

The client host 300 is a computer device equipped with a CPU, a memory, a storage unit, and an interface, and uses a database service, a web service, and the like provided from the primary server host 100 (the secondary server host 200 in case of failover).

Specifically, a client program 301 is run on the client host 300. The client program 301 is software such as a web browser or a database client.

The client host 300 has a request log 302 and a DNS cache 303 recorded therein. The request log records a data input/output request made by the client host 300 after a failure suspension is detected by the secondary server host 200. The DNS cache 303 temporarily records DNS information the client host 300 obtains from the DNS host 400. The DNS information is recorded together with the period during which the cached DNS information is valid (cache valid in TTL). This makes the client host 300 to choose a host to access based on the cached DNS information without consulting the DNS host 400 for DNS information while the cache is valid.

The client host 300 has an interface to the wide area network 500 (e.g., NIC: Network Interface Card such as Ethernet Card).

The DNS host 400 is a computer device equipped with a CPU, a memory, a storage unit, and an interface, and runs a DNS server 401.

The DNS server 401 supplies hosts in the zone (the client host 300 and the server hosts 100 and 200) with DNS information (IP addresses corresponding to domain names) referring to DNS information 402. A zone file in which IP addresses are associated with domain names is recorded in the DNS information 402. When the client host 300 uses a host name to access the server host 100 or other host, the client host 300 consults the DNS server 401 for the IP address of the server host and accesses the server host through the IP address.

The DNS server host 400 has an interface to the wide area network 500 (e.g., NIC: Network Interface Card such as Ethernet Card).

The wide area network 500 is structured for data and control information communications between computers by, for example, TCP/IP protocol.

The remote copy network 510 is a network on which communications can be made by a protocol suitable for data transfer, such as fibre channel protocol. The primary storage 150 and the secondary storage 250 may be connected to each other on a one-on-one basis.

Described next is the operation of the computer system according to the embodiment of the present invention.

Figure 2:
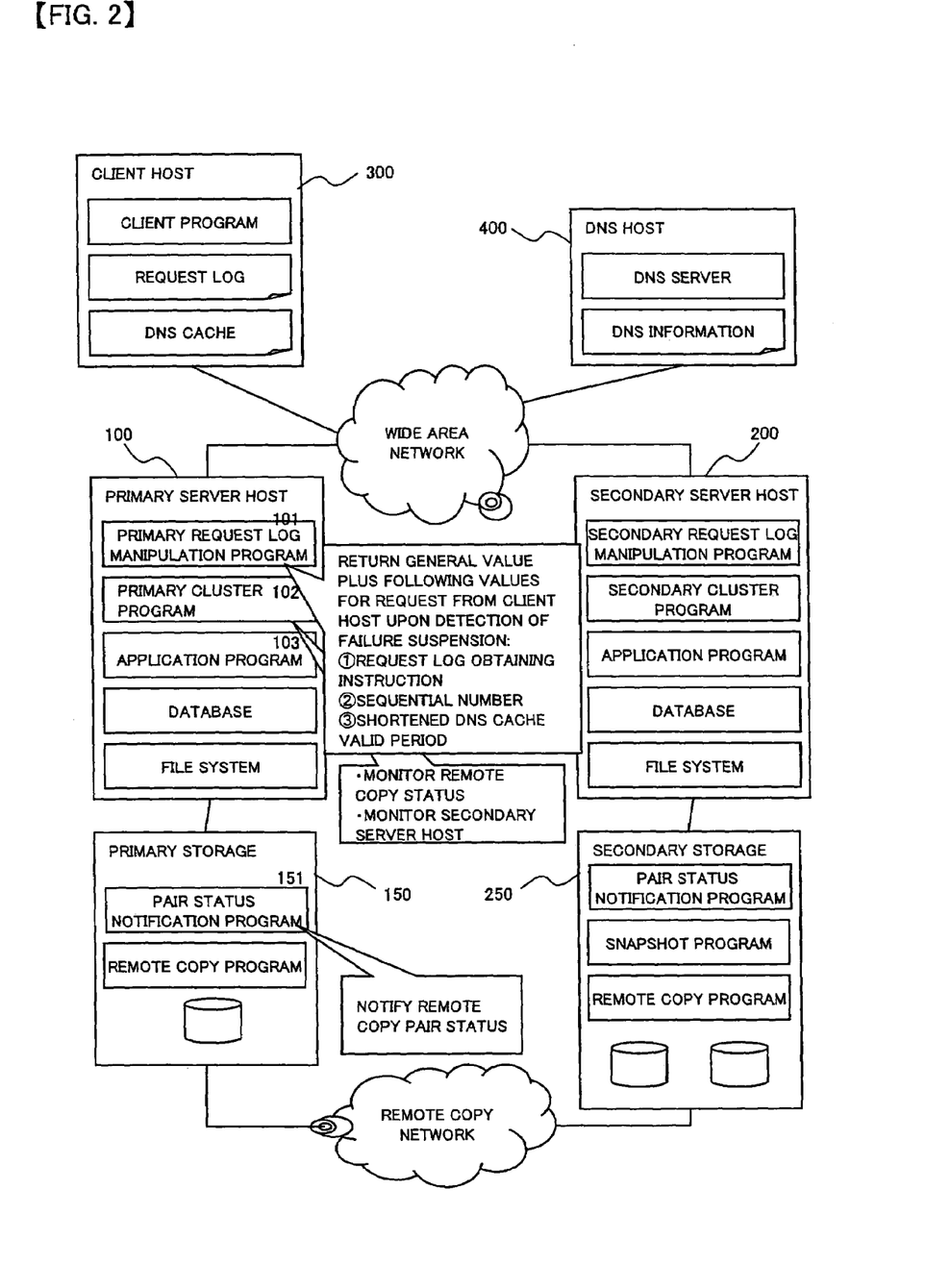
FIG. 2 is an explanatory diagram for a primary server host operation of when a failure suspension is detected in the embodiment of the present invention.

FIG. 2 is a diagram illustrating the operation of when a failure is detected by the primary server host 100 in the embodiment of the present invention.

The application program 103 in the primary server host 100 sends results of processing made upon a data input/output request from the client host 300 (for instance, data read upon the request or success or failure of writing made upon the request). If at this point the primary cluster program 102 is notified by the pair status monitor program 151 of unsuccessful remote copying between the primary storage 150 and the secondary storage 250, it is judged that there is also a possibility of failure in the primary site. This is because, at the time when remote copying fails, there is no way to know which of the communication line (remote copy network 510) and the storage fails and because, if it is found to be the communication network that fails, the failure could spread to the primary site.

At this point, the primary cluster program 102 is notified from the pair status monitor program 151. As the primary cluster program 102 detects unsuccessful remote copying between the primary storage 150 and the secondary storage 250 from the notification by the pair status monitor program 151 and judges that there is a strong possibility that a failure spreads all over the primary site, the primary cluster program 102 executes the following processing in anticipation of shutdown of the primary site. Note that the following processing is merely to prepare the secondary site for takeover in case the primary site is actually shut down and that the primary site continues to operate and process a request from the client host at the time being. Failure of remote copying could be due to a temporary failure in the communication network and, in this case, the network failure is recovered in a short period of time making the primary site to continue operation. A failure in the primary storage 150 may be detected by other failure monitoring methods.

The primary request log processing program 101 first sends, to the client host 300, along with results of processing made upon a data input/output request, identification number to be attached to the data input/output request (for example, sequential number attached according to the order of processing the data input/output request). The client host 300 records the identification number in the request log 302, so that the secondary server host 200 which obtains the request log 302 can later identify the data input/output request.

The primary request log processing program 101 also sends an instruction to the client host 300 which tells the client host 300 to record in the request log 302 data input/output requests the client host 300 has made to the server hosts 100 and 200. The secondary server host 200 collects the data input/output requests recorded in the request log 302 to grasp what sort of data input/output requests have been made from detection of a failure until switching between the servers.

Upon receiving the request log recording instruction, the client host 300 starts recording in the request log 302 data input/output requests made to the primary server host 100.

As will be described later, the secondary request log processing program 201 collects the request log from the client host 300 upon detection of a failure in the primary site (see FIG. 4). Alternatively, collection of the request log from the client host 300 may be started upon detection of a failure (failure suspension). The client program 301 may record in the request log upon reception of the request log recording instruction and send the request log periodically to the secondary server host 200 (secondary cluster program 202). Preferably, the IP address of the secondary server host 200 at this point is notified to the client host 300 along with a log obtaining instruction but other methods may be used to notify the IP address of the secondary server host 200.

The primary request log processing program 101 sends an instruction to the client host 300 which instructs the client host 300 or/and DNS host 400 to shorten the time to live of the DNS cache, so that the period in which the DNS cache 303 stored in the client host 300 is referred to is cut short and the server host to be accessed is quickly switched. The DNS cache time to live shortening instruction may be sent by the primary server host 100 or by the secondary server host 200 as will be described later.

Figure 3:
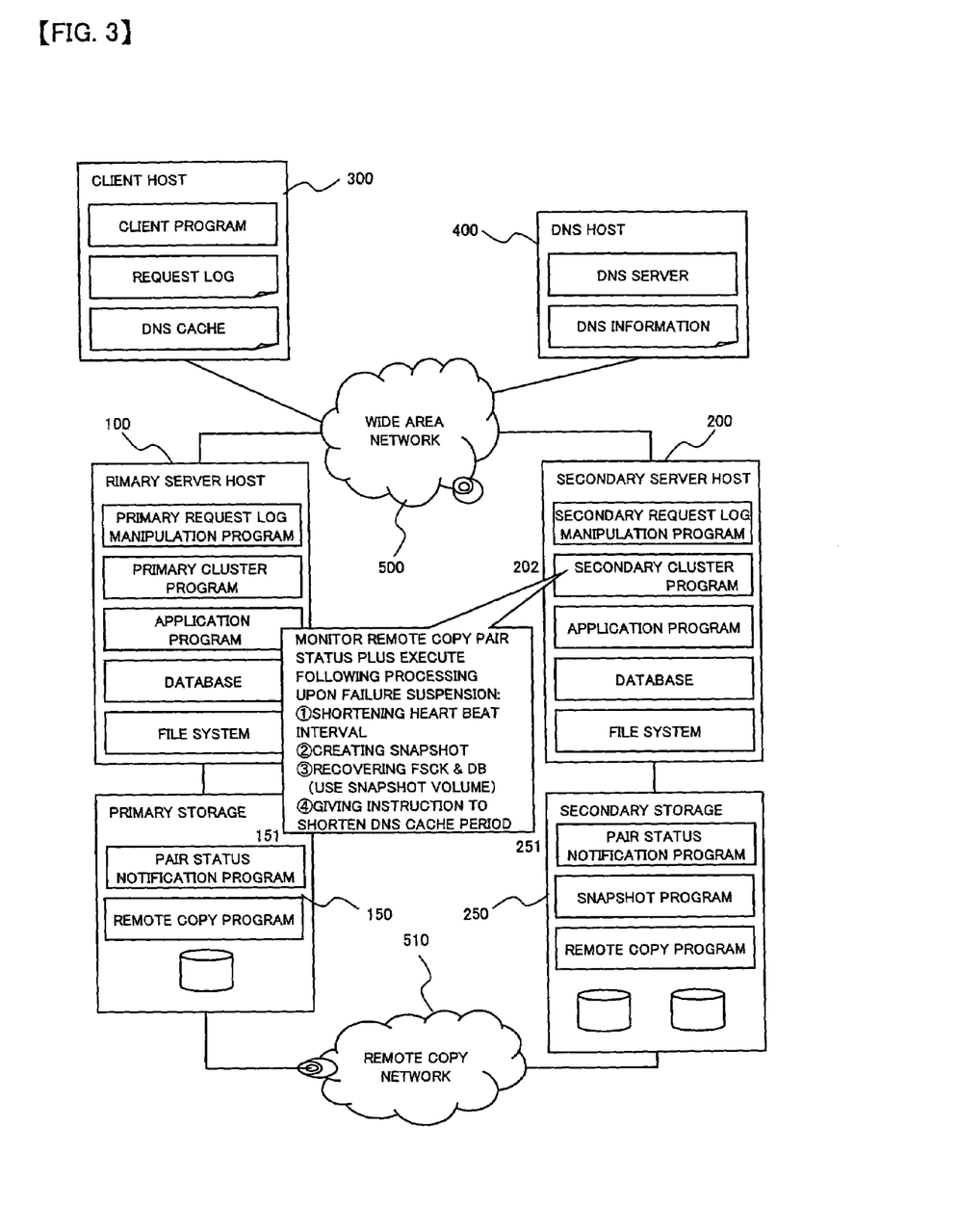
FIG. 3 is an explanatory diagram for a secondary server host operation of when a failure suspension is detected in the embodiment of the present invention.

FIG. 3 is a diagram illustrating the operation of when a failure is detected by the secondary server host 200 in the embodiment of the present invention.

The secondary cluster program 202 in the secondary server host 200 receives notification from the pair status monitor program 251 and detects unsuccessful remote copying between the primary storage 150 and the secondary storage 250. Then the secondary cluster program 202 assumes a failure in the primary storage 150 and judges that the secondary site may have to take over processing that has been executed by the primary site. The secondary cluster program 202 executes the following processing in anticipation of shutdown of the primary site. A failure in the primary storage 150 may be detected by other failure monitoring methods.

The secondary cluster program 202 first shortens the intervals at which a failure is monitored with the use of heart beat between the primary and secondary sites, so that the frequency of monitoring increases and a change in state of the primary server host 100 and the primary storage 150 can be detected immediately.

The secondary cluster program 202 also takes a snapshot of when the failure is detected.

Furthermore, by using the virtual volume of the snapshot, the secondary cluster program 202 orders a file system program to check the volume, and orders a database program to start recovery.

Moreover, the secondary cluster program 202 sends to the client host 300 a DNS cache time to live shortening instruction to quickly switch the server host to be accessed. If the system is designed such that the secondary server host 200 is capable of sending the DNS cache time to live shortening instruction, appropriate measures can be taken when a failure takes place in the primary server host 100.

Figure 4:
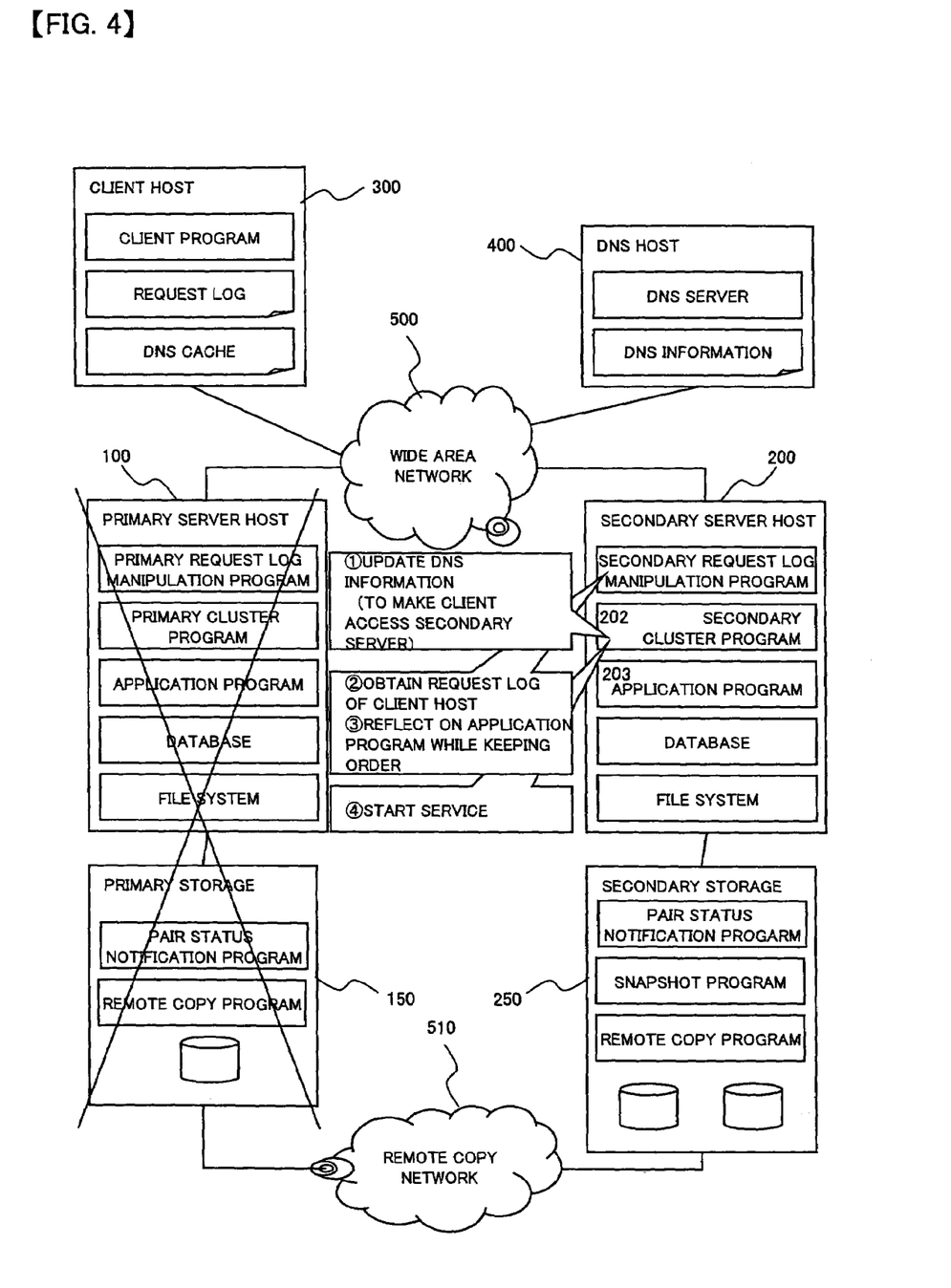
FIG. 4 is an explanatory diagram for a secondary server host operation of when a primary server host is stopped in the embodiment of the present invention.

FIG. 4 is a diagram illustrating the operation of when shutdown of the primary server host 100 is detected by the secondary server host 200 in the embodiment of the present invention.

The secondary cluster program 202 is monitoring the operation of the primary server host 100 using a failure monitoring method such as heart beat. When shutdown of the primary server host 100 is detected through the failure monitoring, the DNS information 402 stored in the DNS host 400 is updated so that the client host 300 accesses to the secondary server host 200 instead of the primary server host 100.

Then the request log is collected from the client host 300 that has accessed after detection of the failure suspension, to thereby obtain the log of data input/output requests made by the client host 300 after the failure has occurred in the primary server host 100. The application program 203 is executed to make the collected request log reflect on the data. To elaborate, since there is a possibility that data input/output requests made by the client host 300 after the primary server host 100 fails are not reflected on the data stored in the primary storage 150, the application program 203 is executed to make the requests reflected on the data of the virtual volume of the snapshot for which the request log is collected in the order of identification number of the collected request log. In this way, data on which the operation after the failure is not reflected, is recovered correctly.

Subsequently, the secondary server host 200 starts providing the service.

Figure 5:
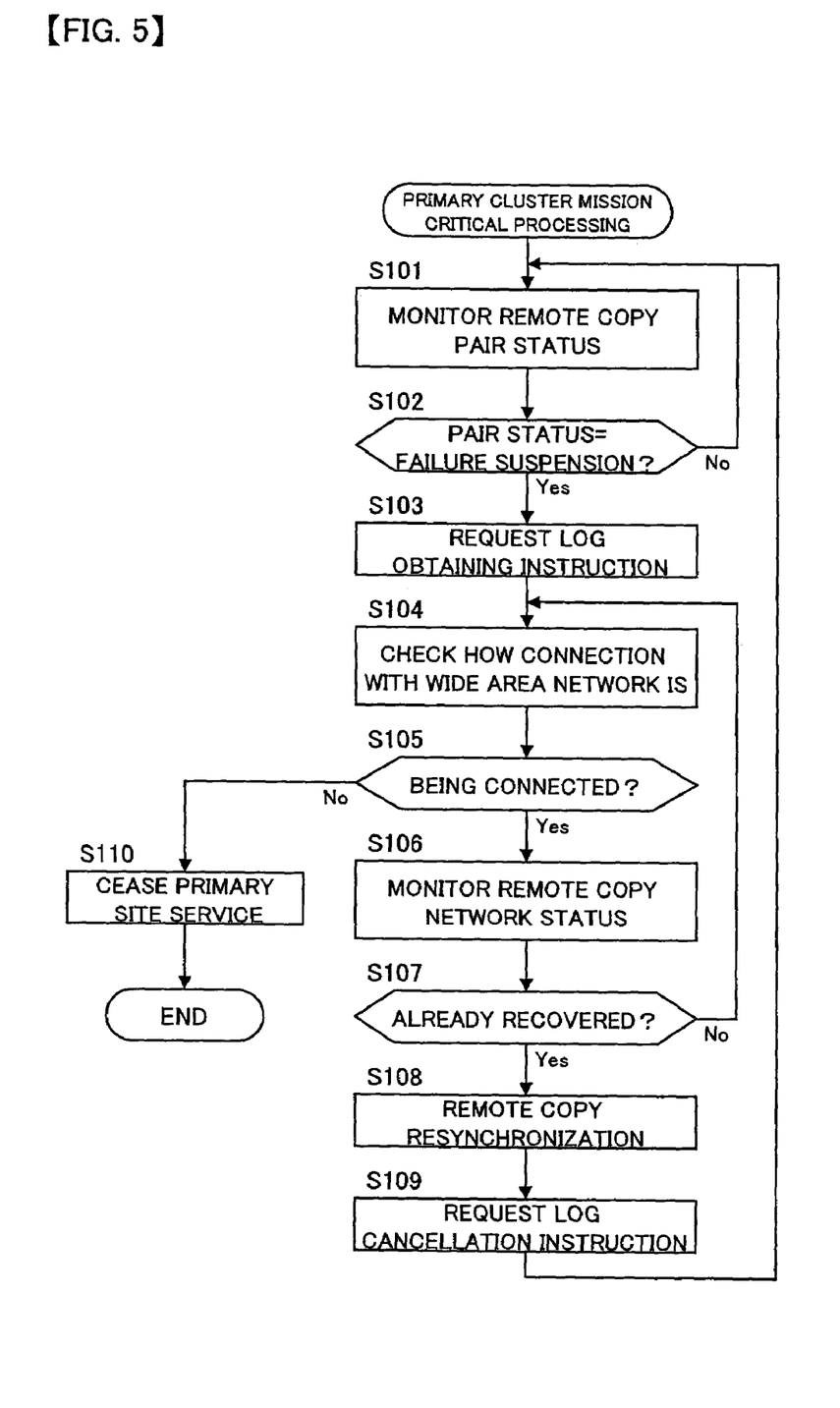
FIG. 5 is a flow chart for main process of a primary cluster according to the embodiment of the present invention.

FIG. 5 is a flow chart for primary cluster main process executed by the primary cluster program 102.

The primary cluster program 102 monitors the remote copy pair status by notification from the pair status notification program 151 (S101). If it is found as a result of the monitoring that the pair status is not "suspended state" (S102), the primary cluster program 102 judges that remote copying is proceeding normally and returns to Step S101 to continue monitoring the remote copy pair status.

On the other hand, if it is found as a result of the monitoring that the pair status is "suspended state" (S102), the primary cluster program 102 judges that remote copying is not proceeding normally and instructs the client host 300 (client program 301) to obtain a request log (S103). At the same time, the primary cluster program 102 instructs to shorten the time to live of the DNS cache 303 (See FIG. 2). Furthermore, the primary cluster program 102 responds to a data input/output request from the client host 300 and sends the response to the client host 300 with sequential number.

Thereafter, the primary cluster program 102 checks whether the primary server host 100 is connected to the wide area network 500 properly or not, and judgment is made on the feasibility of communication with the secondary server host 200 (S104). Moreover, whether the primary server host 100 is connected to the wide area network 500 properly or not can be checked through communication with the DNS host 400 (for example, through query about an IP address).

If it is judged as a result of the checking that the primary server host 100 is not connected to the wide area network 500 properly, the primary server host 100 is stopped from providing the service (S110) and the primary cluster main process is ended.

On the other hand, if it is judged as a result of the checking that the primary server host 100 is connected to the wide area network 500 properly, the status of the remote copy network 510 is monitored (S106). A known failure monitoring method is used to monitor the status of the remote copy network 510. For instance, whether communication via the remote copy network 510 is possible or not can be found out by sending PING (Packet Internet Groper) via the remote copy network 510 and checking the response.

If it is found as a result of the monitoring that the status of the remote copy network 510 is not recovered, the process returns to Step S104 and whether the primary server host 100 is connected to the wide area network 500 properly or not is checked again.

On the other hand, if it is found as a result of the monitoring that the status of the remote copy network 510 has been recovered, there is no need for failover to the secondary server host 200 and the remote copy pair status which has temporarily been out of sync is resynchronized (S108). In this resynchronization processing, only data written in the primary storage 150 after the remote copy pair status becomes the failure suspension state is copied to the secondary storage 250 by referring to a bitmap that indicates a writing position past the failure suspension. This is called differential copying, by which writing in the primary storage 150 after the failure suspension is reflected on the secondary storage 250 and the synchronous status is restored.

Then the client host 300 (client program 301) is notified of cancellation of the request log obtaining instruction (S109). The notification of cancellation of the request log obtaining instruction may be included in the response to an access to the primary server host 100 by the client host 300. The cancellation may simultaneously be notified to the client host 300 to which the request log obtaining instruction is sent in Step S103.

Figure 6:
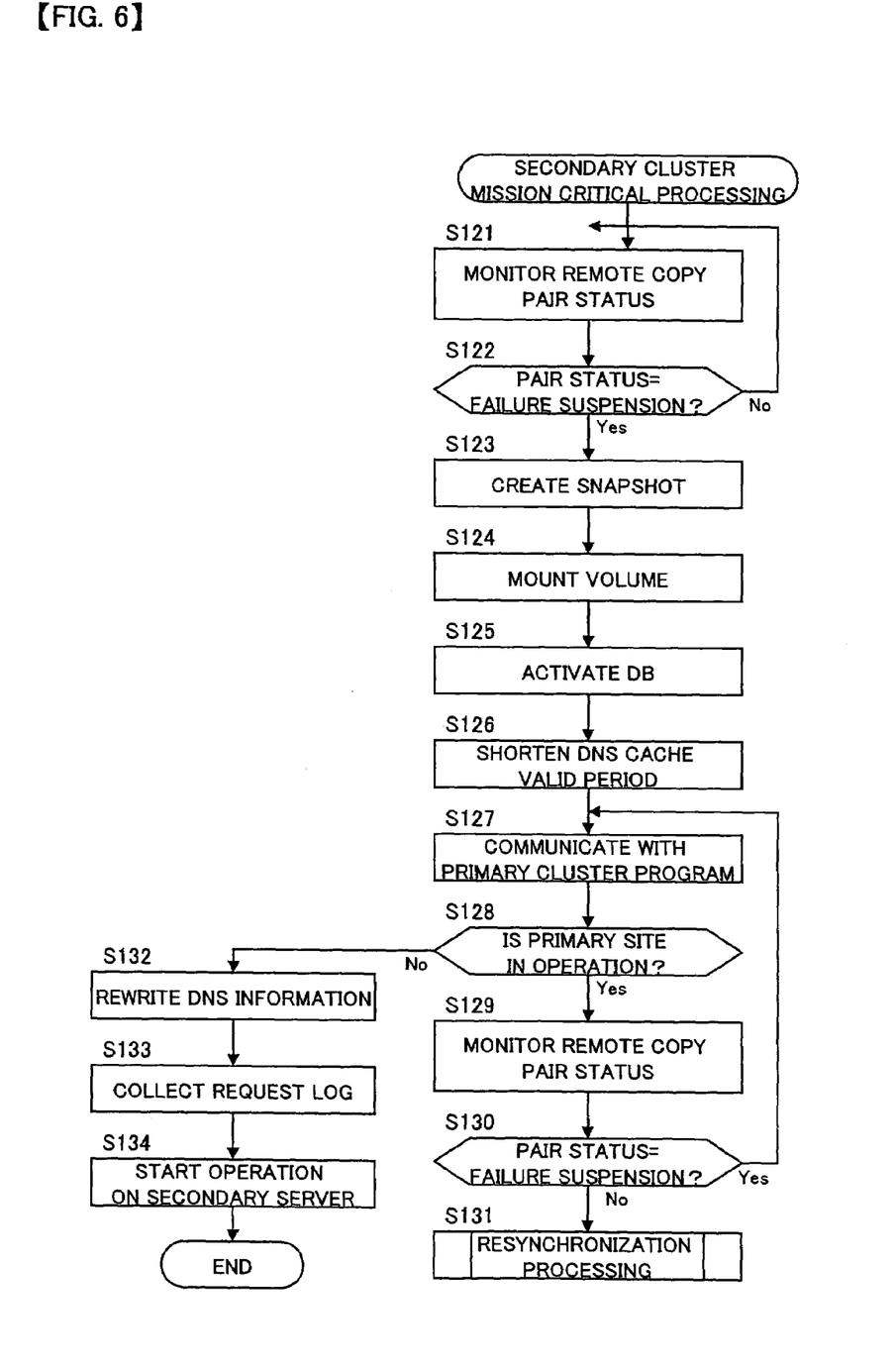
FIG. 6 is a flow chart for main process of a secondary cluster according to the embodiment of the present invention.

FIG. 6 is a flow chart of a secondary cluster main processing executed by the secondary cluster program 202.

The secondary cluster program 202 monitors the remote copy pair status by notification from the pair status notification program 151 (S121). If it is found as a result of the monitoring that the pair status is not "suspended state" (S122), the secondary cluster program 202 judges that remote copying is proceeding normally and returns to Step S121 to continue monitoring the remote copy pair status.

On the other hand, if it is found as a result of the monitoring that the pair status is "suspended state", the secondary cluster program 202 judges that remote copying is not proceeding normally and creates a snapshot of LU 254 (S123).

Thereafter the file system mounts the logical unit 254 (S124), and the database system 204 is activated (S125). Specifically, after the database system 204 is re-activated, a log file (history file) obtained separately is reflected on the data of the snapshot created in Step S123 for database recovery processing.

Then the time to live of the DNS cache is shortened to make the client host 300 to access the secondary server host 200 quickly upon failover to the secondary server host 200 (S126). The time to live of the DNS cache shortening in Step S126 includes turning the DNS cache invalid (for example, setting the time to live of the DNS cache to "0"). This and above processing completes preparation for failover to the secondary server host 200.

The secondary cluster program 202 then makes an attempt to communicate with the primary server host 100 (primary cluster program 102) via the wide area network 500 (S127). Whether the primary server host 100 is in operation or not is judged from whether communication with the primary server host 100 is possible or not (S128).

If communication with the primary server host 100 is found as a result to be not possible, it is judged that the primary server host 100 is not in operation and the process moves to Step S132, where processing for failover to the secondary server host 200 is started.

On the other hand, if communication with the primary server host 100 is found as a result to be possible, it is judged that the primary server host 100 is in operation and the secondary cluster program 202 monitors the remote copy pair status by notification from the pair status notification program 151 (S129). If it is found as a result of the monitoring that the pair status is "suspended state" (S130), the secondary cluster program 202 judges that communication between primary and secondary storages is impossible and returns to Step S127. Furthermore, the secondary cluster program 202 judges from communication with the primary cluster program 102 whether the primary server host 100 is in operation or not.

On the other hand, if it is found as a result of the monitoring that the pair status is not "suspended state", it is judged that remote copying between the primary site and the secondary site is resumed and resynchronization processing (FIG. 7) is executed (S131). Thereafter, the process returns to Step S121 to continue monitoring the remote copy pair status.

In the failover processing from Step S132 on, first, the DNS information stored in the DNS host 400 is updated (S132). The rewrite step is for changing the recorded IP address that corresponds to the domain name of the primary server host 100 to the IP address of the secondary server host 200. The updated DNS information causes the client host 300 to access the secondary server host 200 as the client host 300 tries to access the primary server host 100 using domain name. Since the DNS cache time to live has been shortened in Step S216, the updated DNS information is quickly reflected and the time period in which the primary server host 100 is accessed by the client host 300 can be cut short.

Then a request log is collected from the client host 300 (S133). The request log is collected upon instruction from the primary server host 100 (Step S103 of FIG. 5).

Collection of the request log from the client host 300 is achieved by specifying the client host 300 to which the primary server host 100 has sent a request log obtaining instruction (Step S103 of FIG. 5) (in other words, the client host that has accessed after detection of a failure suspension), and by inquiring the specified client host 300 about a request log. This method is suitable for Internet services provided to a large number of client hosts in general. It is also possible to inquire every client host 300 about a request log. The method is suitable for a case where every client host that has an access is known in advance, such as terminals of a business operation-oriented system (e.g., bank system).

The secondary cluster program 202 then uses the identification number (sequential number) attached to the obtained request log to check how many of data input/output requests in the obtained request log are reflected on the data. Data input/output requests that are not reflected are specified and reflected on the data by the application program 203 to recover the data.

Thereafter, the secondary server host 200 takes over operation from the primary server host 100 (S134), thus ending the secondary cluster main processing.

Figure 7:
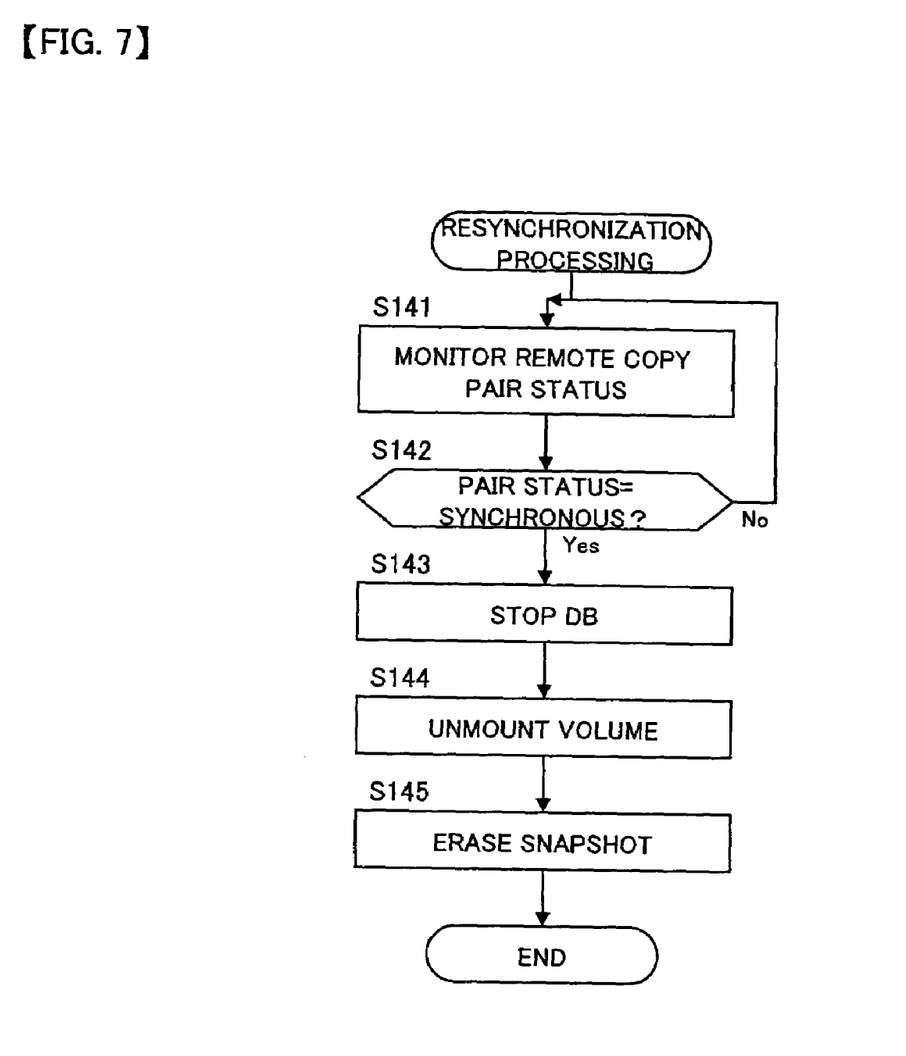
FIG. 7 is a flow chart for resynchronization processing according to the embodiment of the present invention.

FIG. 7 is a flow chart of the resynchronization processing executed by the secondary cluster program 202 (Step S131 of FIG. 6).

In the resynchronization processing, the remote copy pair status is first monitored by notification from the pair status notification program 151 (S141). If it is found as a result of the monitoring that the pair status is not "synchronous" (S142), it is judged that remote copying is not proceeding normally and the process returns to Step S141 to continue monitoring the remote copy pair status. At this point, remote copying is being executed by the primary cluster program 102 (Step S108 of FIG. 5) and therefore the monitoring in Step S141 is continued until the remote copying is finished.

On the other hand, if it is found as a result of the monitoring that the pair status is "synchronous", it is judged that remote copying is proceeding normally (the remote copying in Step S108 of FIG. 5 has been finished normally) and the database system 204 is stopped (S143) to start volume unmounting processing in which the logical unit 254 of the secondary storage 250 is separated from file system (S144).

The snapshot (differential data and mapping table) created in Step S123 of FIG. 5 is now unnecessary and erased (S145).

Figure 8:
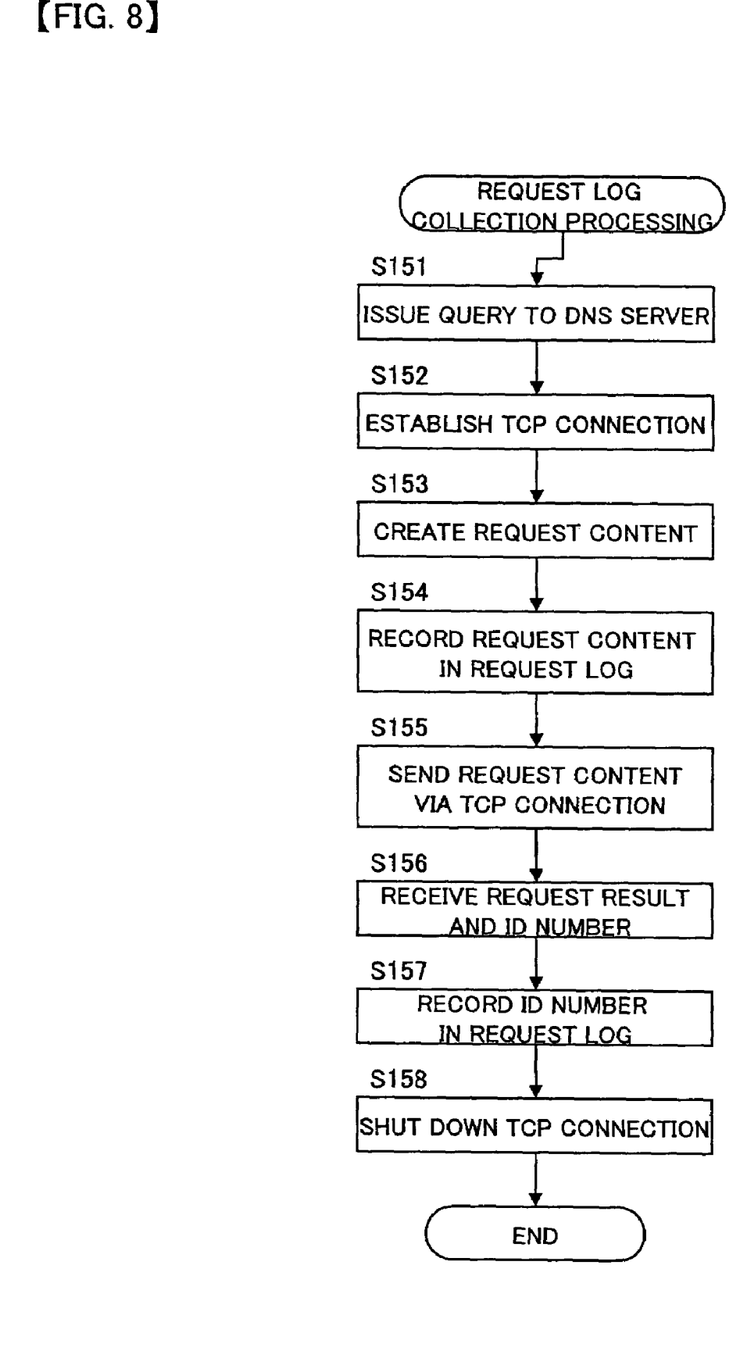
FIG. 8 is a flow chart for request log collection processing according to the embodiment of the present invention.

FIG. 8 is a flow chart of the request log collection processing executed by the client program 301.

The request log collection processing is activated by a request log obtaining instruction sent from the primary server host 100 (Step S103 of FIG. 5), and writes what substance of request in the request log 302 each time the primary server host 100 is accessed.

In the request log collection processing, a domain name is first sent to the DNS host 400, an IP address query is issued (S151), and the IP address is obtained in order to access the primary server host 100. Then a request for establishing a TCP connection is sent to the primary server host 100 to be accessed in order to establish a TCP connection with the primary server host 100 (S152).

Then the content of a data input/output request to be sent to the primary server host 100 is created (S153). The created request content is recorded in the request log 302 (S154), and sent to the primary server host 100 via the established TCP connection (S155).

The request result (data read upon the request, success or failure of writing made upon the request, or the like) and identification number attached to the request result by the primary server host 100 are received (S156). The identification number is recorded in the request log 302 in a manner that associates the identification number with the previously recorded request content (S157).

The established TCP connection is then shut down (S158).

Figure 9:
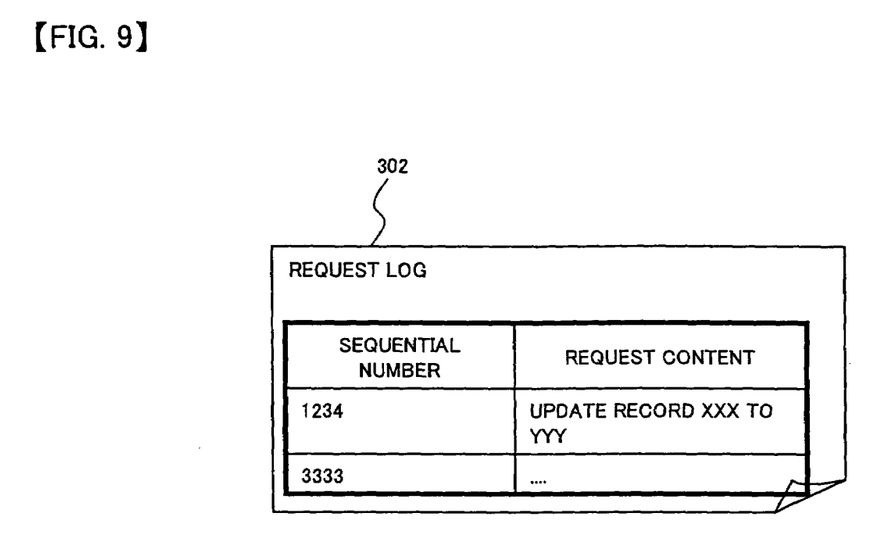
FIG. 9 is an explanatory diagram of contents of a request log 302 according to the embodiment of the present invention.

FIG. 9 is an explanatory diagram of request log contents.

In the request log 302, what request (data input/output request) has been sent to the primary server host 100 and identification number (sequential number) attached to the request by the primary server host 100 are recorded in a manner that associates the request content and identification number with each other.

Figure 10:
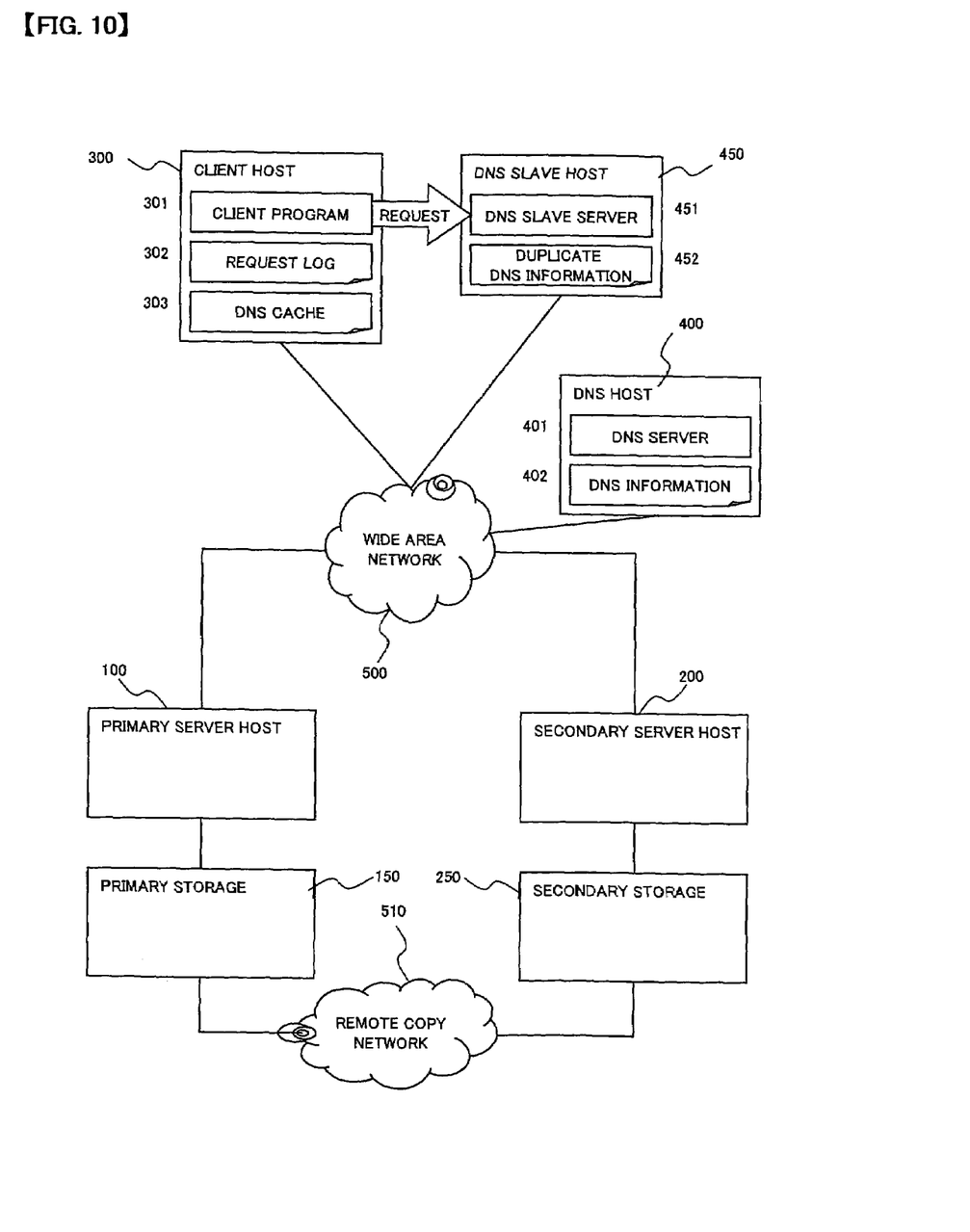
FIG. 10 is a block diagram showing a modification example of the computer system according to the embodiment of the present invention.

FIG. 10 is a block diagram showing a modification example of the computer system according to the embodiment of the present invention.

A computer system according to the modification example has a DNS slave host 450 in addition to the components of the above-described computer system (FIG. 1).

The DNS slave host 450 is a computer device equipped with a CPU, a memory, a storage unit, and an interface, and is connected to the client host 300 and to the DNS host 400 via the wide area network 500.

The DNS slave host 450 runs a DNS slave server 451 and holds duplicate DNS information 452.

The duplicate DNS information 452 holds the same contents as the DNS information 402 of the DNS host 400.

The DNS slave server 451 responds to a DNS request from the client host 300 similar to the DNS server 401 of the DNS host 400 and, in addition, updates the duplicate DNS information 452 by obtaining DNS information from the DNS host 400 when expiration of the time to live of the DNS cache of the duplicate DNS information 452 is detected.

In the computer system of the modification example also, an instruction to shorten the time to live of the DNS cache is sent to the DNS host 400 upon a remote copy pair failure suspension. The DNS slave host 450 obtains new duplicate DNS information whose time to live is shortened when the time to live of the DNS cache of the duplicate DNS information 452 has expired. The time to live of the cache shortening instruction is also sent to the client host 300 and, ultimately, the time to live of the duplicate DNS information 452 and the time to live of the DNS cache 303 of the client host 300 are shortened. It is sufficient if at least one of the time to live of the duplicate DNS information 452 and the time to live of the DNS cache 303 of the client host 300 is shortened.

The time to live of the DNS cache slave server 451 can be shortened even in a case where control of the time to live of the DNS cache 303 is not in effect in the modification example. Therefore, this case too can obtain the same effects.

What is claimed is:

1. A computer system comprising:
   a primary site that comprises a primary server for providing a client with a service and a primary storage connected to the primary server and storing data to be provided to the primary server;
   a secondary site that comprises a secondary server for providing the client with the service and a secondary storage connected to the secondary server and storing data provided to the secondary server, the secondary site operating when a failure takes place in the primary server, which is for regular operation,
   the primary storage and the secondary storage comprising a remote copy unit to make contents stored in the primary storage and contents stored in the secondary storage identical to each other; and
   a DNS server for providing DNS information, which gives the client an access to the server that provides the service,
   wherein the DNS information obtained from the DNS server is recorded by the client along with information that defines a time to live of the DNS information,
   wherein the primary server comprises a primary request log processing unit, a primary site processing unit, and an application unit,
   wherein the application unit receives a data input/output request from the client and sends a result of processing made upon the request to the client,
   wherein the primary site processing unit detects whether it is possible to communicate with the secondary site or not,
   wherein, when the primary site processing unit detects that communication with the secondary site is impossible, the primary request log processing unit sends identification number to be attached to the data input/output request along with the result of the processing made upon the data input/output request, instructs to record, in a request log, with the identification number, the request sent from the client to the primary server, and instructs to shorten the recorded time to live of the DNS information,
   wherein the secondary server comprises a secondary request log processing unit, a secondary site processing unit, and an application unit,
   wherein the secondary site processing unit detects whether it is possible to communicate with the primary site or not, and
   wherein, when the secondary site processing unit detects that communication with the primary site is impossible, the secondary request log processing unit increases a frequency of monitoring the primary site, takes a snapshot of the primary storage, starts preparation of providing the service to the client on the secondary site using the taked snapshot, and instructs to shorten the recorded time to live of the DNS information.

2. A program which is implemented in a computer system that comprises: a primary site comprising a primary server for providing a client with a service and a primary storage connected to the primary server and storing data provided to the primary server; a secondary site comprising a secondary server for providing the client with the service and a secondary storage connected to the secondary server and storing data provided to the secondary server, the secondary site operating when a failure takes place in the primary server, which is for regular operation; and a DNS server for providing DNS information, which gives the client an access to the server that provides the service, the program causing the client recording the DNS information obtained from the DNS server and information that defines a time to live of the DNS information, the program causing the primary storage and the secondary storage making contents stored in the primary storage and contents stored in the secondary storage identical to each other, the program causing the primary server:
sending a result of processing made upon a data input/output request to the client;
detecting whether it is possible to communicate with the secondary site or not;
sending identification number to be attached to the data input/output request with the result of the data input/output request, when communication with the secondary site is detected to be impossible;
instructing, when a failure is detected in the secondary site, to record, in a request log, together with the identification number, the request sent from the client to the primary server; and
giving an instruction to shorten the recorded time to live of the DNS information, when communication with the secondary site is detected to be impossible, and the program causing the secondary server:
detecting whether it is possible to communicate with the primary site or not;
increasing a frequency of monitoring the primary site, when communication with the primary site is detected to be impossible;
taking a snapshot of the primary storage at the time of detecting a failure, when communication with the primary site is detected to be impossible;
starting preparation of providing the service to the client on the secondary site using the taked snapshot, when a failure is detected in the primary site; and
giving an instruction to shorten the recorded time to live of the DNS information, when a failure is detected in the primary site.

3. The program according to claim 2, wherein, when the primary server is not in operation, the secondary server is further caused:
rewriting DNS information to be recorded in the DNS server;
collecting request log recorded by the client;
reconstructing data recorded in the secondary storage from the collected request log; and
starting preparation of providing the service to the client on the secondary server after the data is reconstructed.

4. The program according to claim 2,
wherein the secondary server is further caused judging the status of remote copying between the primary storage and the secondary storage, and
wherein, when the primary server is in operation and the remote copying is not stopped, the secondary server is further caused performing resynchronization processing for making contents stored in the primary storage and contents stored in the secondary storage identical to each other.

5. A computer system comprising:
a primary site comprising a primary server for providing a client with a service and a primary storage connected to the primary server and storing data provided to the primary server; and
a secondary site comprising a secondary server for providing the client with the service and a secondary storage connected to the secondary server and storing data provided to the secondary server, the secondary site operating when a failure takes place in the primary server, which is for regular operation,
the primary storage and the secondary storage comprising a remote copy unit to make contents stored in the primary storage and contents stored in the secondary storage identical to each other,
wherein the client comprises a cache for recording address information that gives the client an access to the server from which the service is provided and information that defines a time to live of the address information, and
wherein the primary server comprises a primary request log processing unit, which instructs the client to shorten the recorded time to live of the address information when communication with the secondary site is detected to be impossible.

6. The computer system according to claim 5,
wherein the primary server comprises an application unit for receiving a data input/output request from the client and for sending a result of processing made upon the request to the client, and
wherein the primary request log processing unit:
sending to the client identification number to be attached to the data input/output request along with the result of the processing made upon the data input/output request when communication with the secondary site is detected to be impossible; and
instructing to record, with the identification number, the request sent from the client to the primary server.

7. The computer system according to claim 5, wherein the secondary server comprises:
a secondary site processing unit for detecting whether it is possible to communicate with the primary site or not; and
a secondary request log processing unit for increasing a frequency of monitoring the primary site, for taking a snapshot of the primary storage, for starting preparation of providing the service to the client on the secondary site using the taked snapshot, and for instructing to shorten the recorded time to live of the address information, when communication with the primary site is detected to be possible.

8. The computer system according to claim 5, further comprising a DNS server for providing the client with address information that gives the client an access to the server from which the service is provided,
wherein the secondary site processing unit updates address information to be recorded in the DNS server, collects a request log recorded by the client, and starts preparation of providing the service to the client on the secondary server after data recorded in the secondary storage is reconstructed from the collected request log, when the primary server is not in operation.

9. The computer system according to claim 5, wherein the secondary site processing unit functions to:
judge a pair status of remote copying between the primary storage and the secondary storage; and perform resynchronization processing for making contents stored in the primary storage and contents stored in the secondary storage identical to each other when the primary server is in operation and the remote copy pair status is not suspended.

10. The computer system according to claim 7, wherein the secondary site processing unit functions to:
judge a pair status of remote copying between the primary storage and the secondary storage;

perform resynchronization processing for making contents stored in the primary storage and contents stored in the secondary storage identical to each other when the primary server is in operation and the remote copy pair status is not suspended; and delete the taked snapshot after the resynchronization processing is completed.

* * * * *